United States Patent
Kobayashi et al.

(10) Patent No.: US 12,254,761 B2
(45) Date of Patent: Mar. 18, 2025

(54) RESCUE SUPPORT APPARATUS, SYSTEM AND METHOD, AND COMPUTER READABLE MEDIUM

(71) Applicant: NEC Corporation, Tokyo (JP)

(72) Inventors: Masanori Kobayashi, Tokyo (JP); Mizuki Kato, Tokyo (JP); Tsubasa Ogikubo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/275,294

(22) PCT Filed: Sep. 6, 2021

(86) PCT No.: PCT/JP2021/032715
§ 371 (c)(1),
(2) Date: Aug. 1, 2023

(87) PCT Pub. No.: WO2023/032215
PCT Pub. Date: Mar. 9, 2023

(65) Prior Publication Data
US 2024/0135800 A1  Apr. 25, 2024
US 2024/0233513 A9  Jul. 11, 2024

(51) Int. Cl.
*G06V 40/50* (2022.01)
*G06V 40/16* (2022.01)
*G08B 25/10* (2006.01)

(52) U.S. Cl.
CPC ........... *G08B 25/10* (2013.01); *G06V 40/172* (2022.01); *G06V 40/50* (2022.01); *G06V 40/168* (2022.01)

(58) Field of Classification Search
CPC .. G08B 25/10; G08B 21/0269; G08B 25/016; G08B 21/182; G08B 25/08; G08B 21/02;
(Continued)

(56) References Cited

U.S. PATENT DOCUMENTS

2019/0147720 A1   5/2019  Sawada et al.

FOREIGN PATENT DOCUMENTS

| JP | 2007-116296 A | 5/2007 |
| JP | 2007-133595 A | 5/2007 |

(Continued)

OTHER PUBLICATIONS

International Search Report for PCT Application No. PCT/JP2021/032715, mailed on Sep. 28, 2021.
JP Office Action for JP Application No. 2023-544989, mailed on Oct. 15, 2024 with English Translation.
(Continued)

*Primary Examiner* — Nimesh Patel
(74) *Attorney, Agent, or Firm* — Sughrue Mion, PLLC

(57) ABSTRACT

A rescue support apparatus includes: a registration unit configured to register biometric information and personal information of a prospective climber to be associated with each other; a reception unit configured to receive an image and positional information of a terminal of an arbitrary finder from the terminal in a case where the arbitrary finder finds a person to be rescued during mountain climbing, the image being obtained by photographing biometric information of the person to be rescued by the terminal of the finder; an authentication control unit configured to control authentication using the registered biometric information for the biometric information contained in the image; and a rescue request unit configured to transmit rescue request information to a rescue system in a case where the authentication is succeeded, the rescue request information containing the personal information associated with the biometric information and the positional information received from the terminal.

13 Claims, 12 Drawing Sheets

(58) Field of Classification Search
CPC ...... G08B 31/00; G08B 25/12; G08B 27/001;
G08B 21/12; G08B 21/0211; G08B
21/0415; G08B 21/043; G08B 21/0446;
G08B 21/0492; G08B 25/005; G06V
40/172; G06V 40/50; G06V 40/168;
G01S 19/17; G01S 19/393; G01S 19/49;
G06T 7/20; G06T 2207/30241; G06T
2207/30244; H04N 23/60; H04M 11/04;
H04M 2203/655; H04M 3/42348; H04M
3/5116; H04M 3/5166; H04M 3/5141;
H04M 1/72418; H04M 7/125; H04M
1/6091; H04M 1/72424; H04M 1/72484;
H04W 4/90; H04W 4/021; H04W 4/029;
H04W 4/02; H04W 4/025; H04W 64/00;
H04L 67/535; H04L 67/52; G06F 16/00;
G06F 11/30; G06F 11/328; G06Q 50/265;
G06Q 10/0635; G21D 3/04
See application file for complete search history.

(56) References Cited

FOREIGN PATENT DOCUMENTS

| | | |
|---|---|---|
| JP | 2012-182685 A | 9/2012 |
| JP | 2013-142915 A | 7/2013 |
| JP | 2014-049065 A | 3/2014 |
| JP | 2017-033108 A | 2/2017 |
| JP | 6222866 B1 | 11/2017 |
| JP | 2018-206229 A | 12/2018 |
| JP | 2019-061361 A | 4/2019 |
| JP | 2019-091160 A | 6/2019 |
| JP | 2019-091162 A | 6/2019 |
| JP | 2019-091300 A | 6/2019 |
| JP | 2019-121255 A | 7/2019 |

OTHER PUBLICATIONS

JP Office Action for JP Application No. 2023-544989, mailed on Jan. 7, 2025 with English Translation.

RESCUE SUPPORT APPARATUS, SYSTEM AND METHOD, AND COMPUTER READABLE MEDIUM

This application is a National Stage Entry of PCT/JP2021/032715 filed on Sep. 6, 2021, the contents of all of which are incorporated herein by reference, in their entirety.

TECHNICAL FIELD

The present disclosure relates to a rescue support apparatus, a system and a method, and a computer readable medium.

BACKGROUND ART

When climbing a mountain, it is often required to submit a mountain climbing notification in advance. Patent Literature 1 discloses a technique related to a mountain climbing/descending notification system for managing user data of climbers and devices respectively possessed by the climbers.

CITATION LIST

Patent Literature

Patent Literature 1: Japanese Unexamined Patent Application Publication No. 2012-182685

SUMMARY OF INVENTION

Technical Problem

Here, if a climber gets lost due to a natural disaster such as an avalanche during mountain climbing or is injured and cannot move, it may become impossible to contact his or her terminal registered in advance. In that case, an appropriate and speedy rescue is required for the climber.

In view of the problem described above, it is an object of the present disclosure to provide a rescue support apparatus, a system, a method, and program for supporting an appropriate and speedy rescue for a climber.

Solution to Problem

A rescue support apparatus according to a first aspect of the present disclosure includes:
registration means configured to register biometric information and personal information of a prospective climber so as to be associated with each other;
reception means configured to receive an image and positional information of a terminal of an arbitrary finder from the terminal in a case where the arbitrary finder finds a person to be rescued during mountain climbing, the image being obtained by photographing biometric information of the person to be rescued by the terminal of the finder;
authentication control means configured to control authentication using the registered biometric information for the biometric information contained in the image; and
rescue request means configured to transmit rescue request information to a rescue system in a case where the authentication is succeeded, the rescue request information containing the personal information associated with the biometric information and the positional information received from the terminal.

A rescue support system according to a second aspect of the present disclosure includes:
a portable terminal carried by a predetermined person; and
a rescue support apparatus,
wherein the rescue support apparatus is configured to:
register biometric information and personal information of a prospective climber so as to be associated with each other,
wherein the portable terminal is configured to:
photograph an image containing biometric information of a person to be rescued in a case where the predetermined person finds the person to be rescued during mountain climbing; and
transmit the image and positional information of the portable terminal to the rescue support apparatus,
wherein the rescue support apparatus is further configured to:
control authentication using the registered biometric information for the biometric information contained in the image received from the portable terminal; and
transmit rescue request information to a rescue system in a case where the authentication is succeeded, the rescue request information containing the personal information associated with the biometric information and the positional information received from the portable terminal.

A rescue support method executed by a computer according to a third aspect of the present disclosure includes:
registering biometric information and personal information of a prospective climber so as to be associated with each other;
receiving an image and positional information of a terminal of an arbitrary finder from the terminal in a case where the arbitrary finder finds a person to be rescued during mountain climbing, the image being obtained by photographing biometric information of the person to be rescued by the terminal of the finder;
controlling authentication using the registered biometric information for the biometric information contained in the image; and
transmitting rescue request information to a rescue system in a case where the authentication is succeeded, the rescue request information containing the personal information associated with the biometric information and the positional information received from the terminal.

A rescue support program according to a fourth aspect of the present disclosure causes a computer to execute:
registration processing configured to register biometric information and personal information of a prospective climber so as to be associated with each other;
reception processing configured to receive an image and positional information of a terminal of an arbitrary finder from the terminal in a case where the arbitrary finder finds a person to be rescued during mountain climbing, the image being obtained by photographing biometric information of the person to be rescued by the terminal of the finder;
authentication control processing configured to control authentication using the registered biometric information for the biometric information contained in the image; and
rescue request processing configured to transmit rescue request information to a rescue system in a case where the authentication is succeeded, the rescue request information containing the personal information associated with the biometric information and the positional information received from the terminal.

Advantageous Effects of Invention

According to the present disclosure, there are provided a rescue support apparatus, a system, a method, and a program for supporting an appropriate and speedy rescue for a climber.

EXAMPLE EMBODIMENTS

Figure 1:
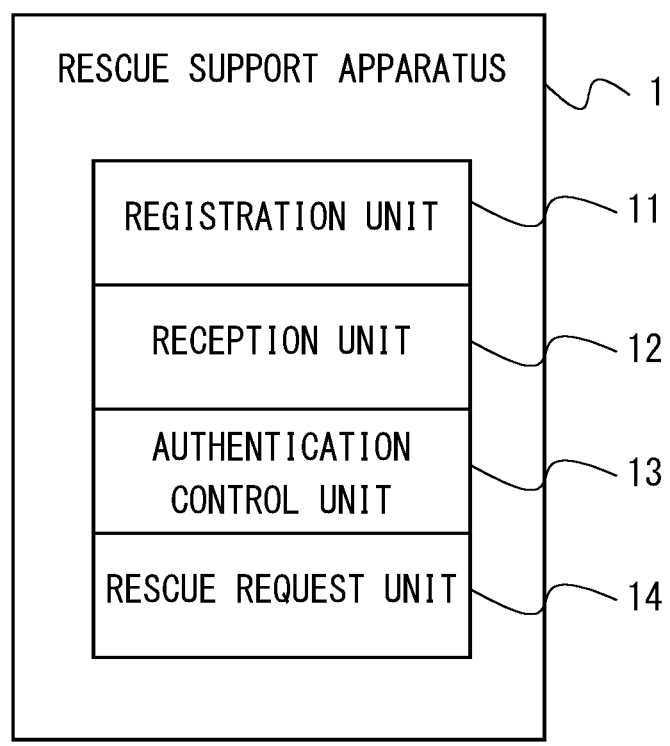
FIG. 1 is a block diagram illustrating a configuration of a rescue support apparatus according to a first example embodiment.

Hereinafter, example embodiments of the present disclosure will be described in detail with reference to the drawings. The same or corresponding elements are respectively denoted by the same reference numerals, and in order to clarify explanation thereof, redundant descriptions thereof will be omitted appropriately.

First Example Embodiment

FIG. 1 is a block diagram illustrating a configuration of a rescue support apparatus 1 according to a first example embodiment. The rescue support apparatus 1 is an information processing apparatus for supporting a rescue request when a person finds another person who gets lost in natural environment such as a mountain.

The rescue support apparatus 1 includes a registration unit 11, a reception unit 12, an authentication control unit 13, and a rescue request unit 14. The registration unit 11 is configured to register biometric information and personal information of a prospective climber so as to be associated with each other. The registration unit 11 is configured to register the biometric information acquired from the prospective climber and the inputted personal information in a storage device inside or outside the rescue support apparatus 1 so as to be associated with each other. Note that in a case where the biometric information is registered in an external storage device, personal information may be associated with the biometric information via identification information (a user ID or the like) that uniquely corresponds to the biometric information.

Here, the prospective climber is a person who plans to climb the mountain in the natural environment described above. Then, the prospective climber registers the biometric information and the personal information in advance by the registration unit 11 so as to be associated with each other before mountain climbing. Then, the prospective climber starts climbing the mountain to become a climber. Note that the mountain climbing includes climbing and descending (descending) a mountain. Here, mountains include snowy mountains where skiing and snowboarding are possible. Further, the natural environment includes mountain streams, valleys, cliffs, rivers, forests, and the like. For that reason, during mountain climbing, climbers may be caught in an avalanche in a snowy mountain or a natural disaster in the natural environment described above. Alternatively, climbers may be incapable of moving due to injury or the like during mountain climbing, and this makes it difficult the climbers to descend the mountain on their own. In this case, such a climber becomes a person who needs rescue (or a person to be rescued).

The reception unit 12 is configured to receive, in a case where an arbitrary finder finds a person to be rescued during mountain climbing, an image obtained by photographing biometric information of the person to be rescued by a terminal of the finder and positional information of the terminal from the terminal. Here, the arbitrary finder is a person who found a person to be rescued, who has difficulty descending the mountain during mountain climbing on his or her own, and may be one of climbers (or prospective climbers). Further, a finder carries a terminal having a photographing function and a wireless communication function. Note that the terminal may also be called a portable terminal. In a case where a finder finds a person to be rescued during mountain climbing, the finder photographs an image containing biometric information of the person to be rescued by using the terminal. Then, the terminal transmits the image and positional information of the terminal to the rescue support apparatus 1.

Further, it is assumed that the rescue support apparatus 1 is connected to a terminal carried by an arbitrary finder and a predetermined rescue system by a communication network (not illustrated in the drawings; hereinafter, the communication network will be also referred to as a "network" simply) or predetermined wireless communication. Note that it does not matter whether the network is wired or wireless regardless of a type of communication protocol.

The authentication control unit 13 is configured to control authentication using the biometric information registered by the registration unit 11 for the biometric information contained in the image received by the reception unit 12. For example, in a case where the rescue support apparatus 1 holds biometric information for authentication in advance, the authentication control unit 13 executes authentication processing by comparing the held biometric information with the received biometric information. Alternatively, in a case where biometric information for authentication is stored in an external authentication device, the authentication control unit 13 causes the authentication device to execute authentication processing, and acquires an authentication result.

The rescue request unit 14 is configured to transmit rescue request information containing the personal information associated with the biometric information and the positional information received from the terminal to the rescue system in a case where the authentication is succeeded. Here, the rescue system is an information system that makes arrangement and instructions for rescuing a person to be rescued on the basis of the rescue request information. The rescue system executes selection of rescue supplies, arrangement of a rescue team, and the like on the basis of the personal information and the positional information contained in the rescue request information. In response, the rescue team goes toward a place indicated by the positional information to rescue the person to be rescued.

Figure 2:
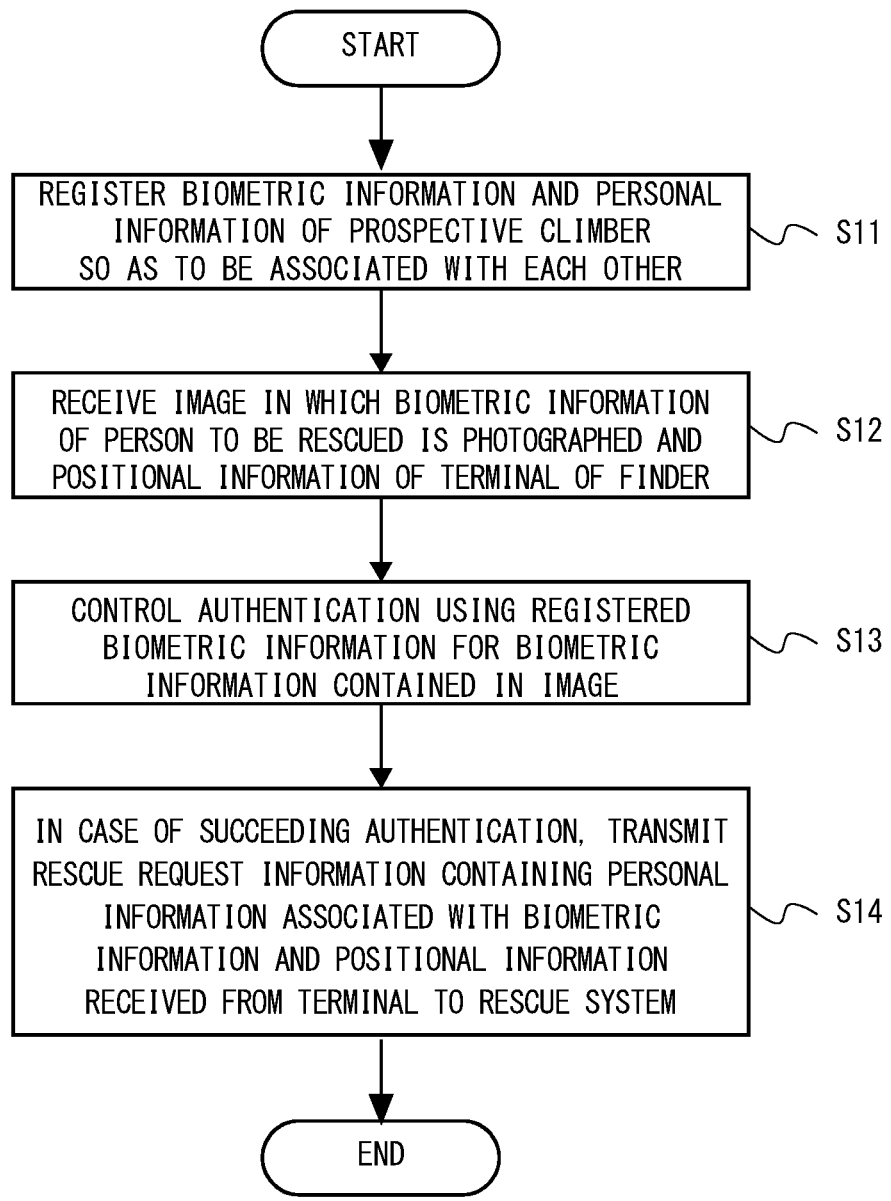
FIG. 2 is a flowchart illustrating a flow of a rescue support method according to the first example embodiment.

FIG. 2 is a flowchart illustrating a flow of a rescue support method according to the first example embodiment. First, the registration unit 11 registers biometric information and personal information of a prospective climber so as to be associated with each other (S11). Next, in a case where an arbitrary finder finds a person to be rescued during mountain climbing, the reception unit 12 receives, from a terminal of the finder, an image in which biometric information of the person to be rescued is photographed by the terminal and positional information of the terminal (S12). Then, the authentication control unit 13 controls authentication using the registered biometric information for the biometric information contained in the image (S13). In a case where the authentication is succeeded, the rescue request unit 14 transmits, to a rescue system, rescue request information containing personal information associated with the biometric information, for which the authentication is succeeded, and the positional information received from the terminal at Step S12 (S14).

As described above, the present example embodiment is intended for a case where a person who has already registered his or her biometric information and personal information in advance becomes a person to be rescued during mountain climbing, and is then found by an arbitrary finder. Here, even though a finder is meeting a person to be rescued for the first time, the finder may photograph biometric information such as a face of the person to be rescued by a portable terminal, and transmit the photographed image and positional information of the terminal. As a result, the rescue support apparatus 1 can specify personal information of the person to be rescued by authentication based on the received image, and execute a rescue request including the positional information corresponding to a finding place and the personal information to a rescue system. For that reason, the rescue system can start appropriate and speedy rescue activities from the personal information and the positional information. For that reason, the rescue support apparatus 1 according to the present example embodiment can support an appropriate and speedy rescue for a climber.

Note that the rescue support apparatus 1 includes a processor, a memory, and a storage device as an unillustrated configuration. Further, a computer program in which processing of the rescue support method according to the present example embodiment is implemented is stored in the storage device. Then, the processor loads the computer program from the storage device into the memory, and executes the computer program. As a result, the processor can realize functions of the registration unit 11, the reception unit 12, the authentication control unit 13, and the rescue request unit 14.

Alternatively, each component of the rescue support apparatus 1 may be realized by dedicated hardware. Further, a part or all of each component of each device may be realized by a general-purpose or special-purpose circuit (circuitry), processor, or the like or a combination thereof. These may be configured by a single chip, or may be configured by a plurality of chips connected to each other via a bus. A part or all of each component of each device may be realized by a combination of the circuit and the program described above. Further, a CPU (Central Processing Unit), a GPU (Graphics Processing Unit), a FPGA (Field-Programmable Gate Array), quantum processor (quantum computer control chip), or the like can be used as the processor.

Further, in a case where a part or all of each component of the rescue support apparatus 1 is realized by a plurality of information processing apparatuses, circuits, or the like, the plurality of information processing apparatuses, the circuits, or the like may be centrally arranged or arranged so as to be distributed to each other. For example, the information processing apparatuses, the circuits, or the like may be realized as a form in which each is connected via a communication network, such as a client-server system, or a cloud computing system. Further, the functions of the rescue support apparatus 1 may be provided in a SaaS (Software as a Service) format.

Second Example Embodiment

Figure 3:
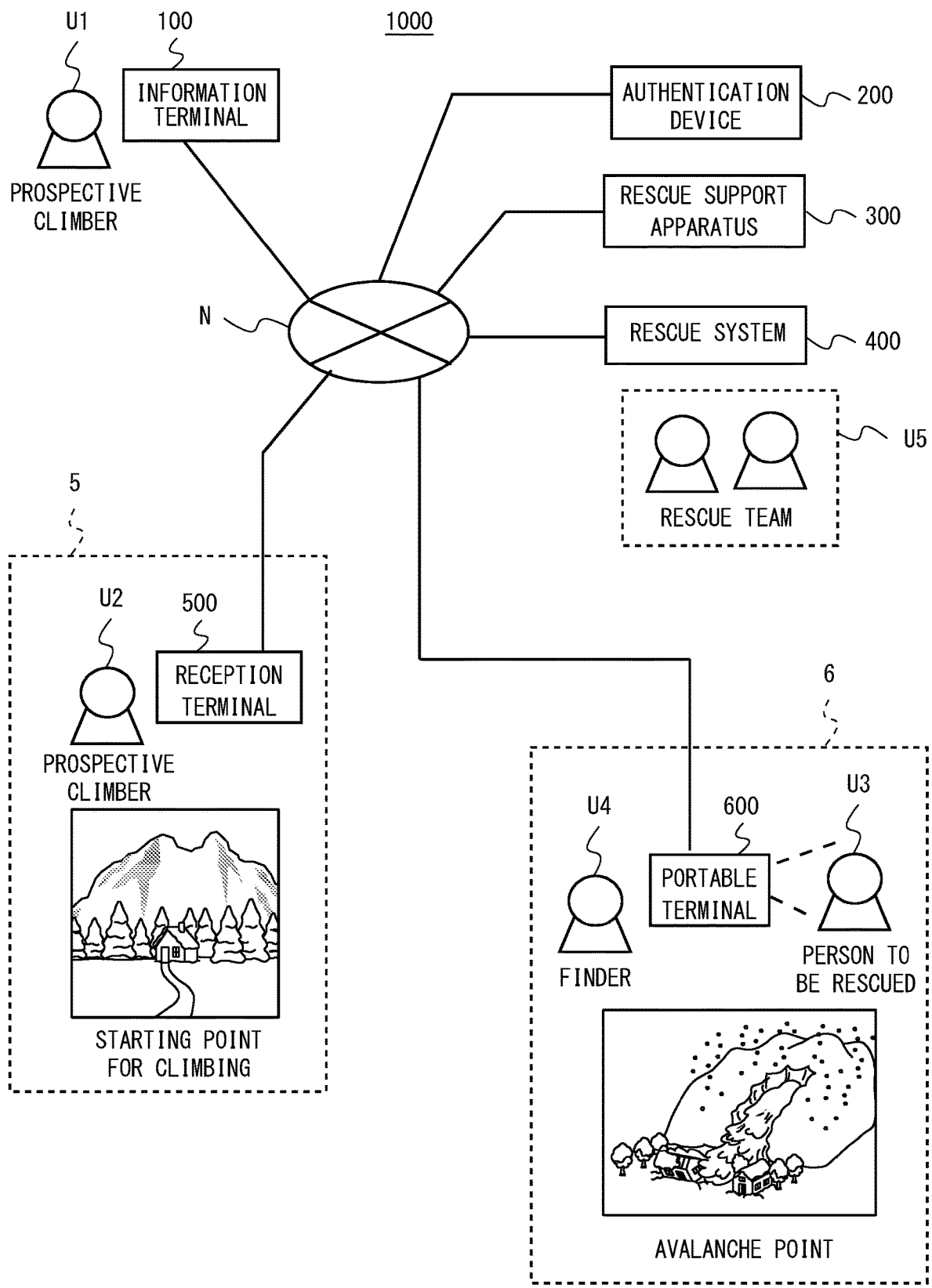
FIG. 3 is a block diagram illustrating the overall configuration of a rescue support system according to a second example embodiment.

A second example embodiment is a concrete example of the first example embodiment described above. FIG. 3 is a block diagram illustrating the overall configuration of a rescue support system 1000 according to the second example embodiment. The rescue support system 1000 is an information system for appropriately and speedily supporting rescue for a person to be rescued U3 whose biometric information and personal information have already been registered in advance. For example, a prospective climber U1 registers his or her face image, personal information, and a plan for climbing to a rescue support apparatus 300 via an information terminal 100 before mountain climbing. Further, a prospective climber U2 who has already registered the above in advance carries out face authentication via a reception terminal 500 at a starting point for climbing 5 before starting to climb a mountain. In a case where the face authentication is succeeded, a digital climbing certificate is issued, and climbing is permitted. Then, the prospective climber U2 starts mountain climbing to become a climber. It is assumed that the climber is then caught in an avalanche at an avalanche point 6, and is incapable of moving to become a person to be rescued U3. Then, it is assumed that a finder U4, who is another climber, finds the person to be rescued U3 at the avalanche point 6. The finder U4 then photographs a face of the person to be rescued U3 by a portable terminal 600, and carries out an operation for a rescue request using the portable terminal 600. In response, the portable terminal 600 transmits rescue request information containing a face image of the person to be rescued U3 and current positional information to a rescue system 400 via the rescue support apparatus 300. As a result, the rescue system 400 arranges a rescue team U5 on the basis of the rescue request information. Then, the rescue team U5 goes toward the avalanche point 6 on the basis of the positional information to rescue the person to be rescued U3.

The rescue support system 1000 includes the information terminal 100, an authentication device 200, the rescue support apparatus 300, the rescue system 400, the reception terminal 500, and the portable terminal 600. The information terminal 100, the authentication device 200, the rescue support apparatus 300, the rescue system 400, the reception terminal 500, and the portable terminal 600 are connected to each other via a network N. Here, the network N is a wired or wireless communication line, for example, the Internet.

The present example embodiment will be described using face authentication, which is one example of biometric authentication, as personal authentication and facial feature information, which is one example of biometric information. However, as the biometric authentication and the biometric information, other techniques using a photographed image of a person can be applied. For example, for the biometric information, data (feature amounts) calculated from physical features unique to an individual, such as fingerprints, voiceprints, veins, retinas, irises of eyes, and patterns (patterns) of palms, may be used. Further, instead of the biometric authentication, another personal authentication may be applied, and the biometric information may also be another personal authentication information. The personal authentication information is information used for authentication of personal identification (personal authentication, personal identification processing, or the like), and is information for uniquely specifying (or identifying) a person. For example, examples of the personal authentication information include a user ID, a combination of an ID and a password, the description content (identification numbers or passwords) of ID cards such as a national identification number or a driver's license, an electronic certificate, code information, and the like, but the personal authentication information is not limited to these. Note that the code information may be a two-dimensional code such as a QR code (registered trademark).

The information terminal 100 is an information processing apparatus operated by the prospective climber U1. For example, the information terminal 100 is a mobile phone terminal, a smartphone, a tablet terminal, a personal computer, or the like. Further, the prospective climber U1 is a person who plans to climb a specific mountain. It is assumed that the prospective climber U1 electronically submits a mountain climbing notification (biometric information, personal information, and a plan for climbing) for mountain climbing in advance. The prospective climber U1 may be the same person as the prospective climber U2 to become a climber later, and may further become the person to be rescued U3 or the finder U4.

The information terminal 100 photographs a face of the prospective climber U1, and receives an input of personal information and a plan for climbing from the prospective climber U1. The information terminal 100 transmits registration information containing a face image, the personal information, and the plan for climbing to the rescue support apparatus 300 via the network N.

The starting point for climbing 5 is a place that becomes an entrance to a mountain, which is a target of the mountain climbing notification. It is assumed that a mountain lodge or the like is installed at the starting point for climbing 5 and the reception terminal 500 is installed therein. The reception terminal 500 executes verification of the personal authentication and the plan for climbing for the prospective climber U2 who has already submitted the mountain climbing notification in advance. In a case where there is no problem, the reception terminal 500 displays climbing permission notification. The reception terminal 500 photographs a face of the prospective climber U2, and transmits a climbing permission request including a photographed face image to the rescue support apparatus 300 via the network N. In a case where there is no problem in the verification of the personal authentication and the plan for climbing, the reception terminal 500 receives climbing permission notification from the rescue support apparatus 300, and displays the climbing permission notification on a screen. As a result, the prospective climber U2 can enter the mountain to start climbing the mountain, thereby becoming a climber.

The authentication device 200 is an information processing apparatus that manages facial feature information of users. Further, in response to a face authentication request received from the outside, the authentication device 200 executes comparison of a face image or facial feature information included in the request with facial feature information of each user, and returns a comparison result (an authentication result) to a request source.

Figure 4:
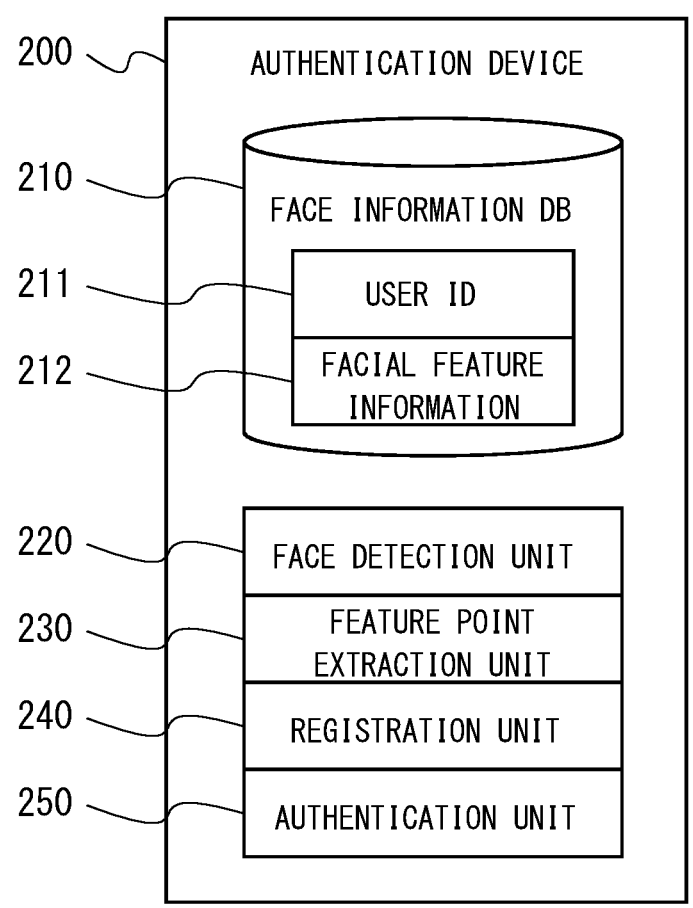
FIG. 4 is a block diagram illustrating a configuration of an authentication device according to the second example embodiment.

FIG. 4 is a block diagram illustrating a configuration of the authentication device 200 according to the second example embodiment. The authentication device 200 includes a face information DB (DataBase) 210, a face detection unit 220, a feature point extraction unit 230, a registration unit 240, and an authentication unit 250. The face information DB 210 stores therein a user ID 211 and facial feature information 212 of the user ID so as to be associated with each other. The facial feature information 212 is a set of feature points extracted from a face image. Note that the authentication device 200 may delete the facial feature information 212 in the face information DB 210 in response to a request from a user or the like corresponding to the facial feature information 212. Alternatively, the authentication device 200 may delete the facial feature information 212 after a certain period of time has passed since registration.

The face detection unit 220 detects a facial area included in a registered image for registering face information, and outputs it to the feature point extraction unit 230. The feature point extraction unit 230 extracts feature points from the facial area detected by the face detection unit 220, and outputs the facial feature information to the registration unit 240. Further, the feature point extraction unit 230 extracts feature points included in the face image received from the rescue support apparatus 300 or the like, and outputs the facial feature information to the authentication unit 250.

The registration unit 240 newly issues the user ID 211 when registering the facial feature information. The registration unit 240 registers the issued user ID 211 and the facial feature information 212 extracted from the registered image in the face information DB 210 so as to be associated with each other. The authentication unit 250 executes face authentication using the facial feature information 212. Specifically, the authentication unit 250 executes comparison of the facial feature information extracted from the face image with the facial feature information 212 in the face information DB 210. In a case where the comparison is succeeded, the authentication unit 250 specifies the user ID 211 associated with the compared facial feature information 212. The authentication unit 250 returns whether the facial feature information matches or not to a request source as a face authentication result. Whether the facial feature information matches or not corresponds to whether the authentication is succeeded or not. Note that matching of the facial feature information (a fact that there is matching) means a case where the degree of coincidence is equal to or more than a threshold value. Further, in a case where the face authentication is succeeded, the face authentication result includes the specified user ID.

Returning to FIG. 3, the description will be continued.

The portable terminal 600 is an information terminal that is carried and operated by the finder U4 and executes transmission and reception of data with the rescue support apparatus 300 via the network N by wireless communication. The portable terminal 600 is a mobile phone terminal, a smartphone, a tablet terminal, or the like.

Figure 5:
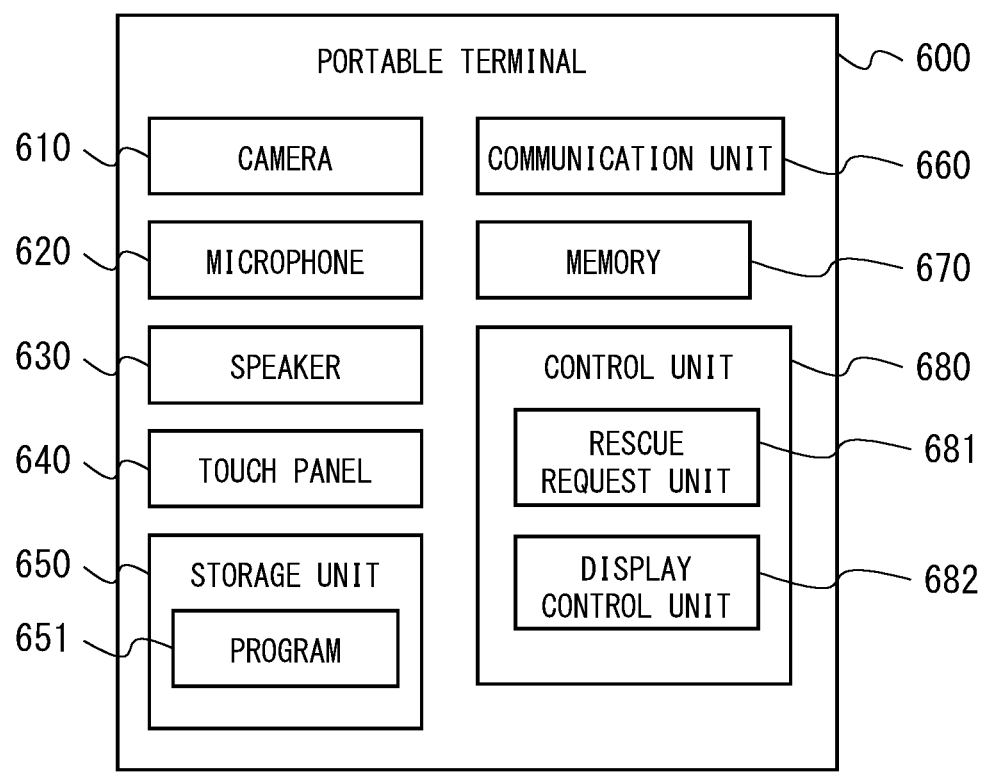
FIG. 5 is a block diagram illustrating a configuration of a portable terminal according to the second example embodiment.

FIG. 5 is a block diagram illustrating a configuration of the portable terminal 600 according to the second example embodiment. The portable terminal 600 includes a camera 610, a microphone 620, a speaker 630, a touch panel 640, a storage unit 650, a communication unit 660, a memory 670, and a control unit 680. The camera 610 is a photographing device that photographing something in accordance with a control of the control unit 680. The microphone 620 is a sound pickup device that picks up voice uttered by the finder U4 or the like. The speaker 630 is a device that outputs sound in accordance with a control of the control unit 680. The touch panel 640 includes a display device (display unit), such as a screen, and an input device. The storage unit 650 is one example of storage devices that include a non-volatile memory such as a flash memory or an SSD (Solid State Drive). The storage unit 650 stores a program 651 for realizing each function of the portable terminal 600. The program 651 is a computer program in which registration processing for user information and processing containing software that operates a user interface are implemented. The communication unit 660 is a communication interface with the network N. Further, the communication unit 660 periodically receives positional information indicating a current position of the portable terminal 600. The positional information is GPS (Global Positioning System) information or the like. The received positional information is stored in the storage unit 650 or the memory 670. The memory 670 is a volatile storage device such as a RAM (Random Access Memory), and is a storage region for temporarily holding information at the time of an operation of the control unit 680. The control unit 680 is a processor that controls hardware included in the portable terminal 600. The control unit 680 loads the program 651 from the storage unit 650 into the memory 670, and executes it. As a result, the control unit 680 realizes functions of a rescue request unit 681 and a display control unit 682.

The rescue request unit 681 is configured to photograph a face of the person to be rescued U3 by an operation of the finder U4. Then, the rescue request unit 681 transmits a rescue request containing the photographed face image and the positional information to the rescue support apparatus 300 via the network N.

The display control unit 682 is configured to display notification information on the touch panel 640 in a case where the notification information is received from the rescue support apparatus 300 via the network N. The notification information may contain an estimated time of arrival of the rescue team U5 and advice information from the rescue team U5.

Returning to FIG. 3, the description will be continued.

The rescue support apparatus 300 is one example of the rescue support apparatus 1 described above. The rescue support apparatus 300 is an information processing apparatus that executes advance registration processing, digital climbing certificate issuance processing, rescue support processing, and the like (that is, a rescue support method according to the second example embodiment). The rescue support apparatus 300 may be made redundant by a plurality of servers, and each functional block may be realized by a plurality of computers.

Figure 6:
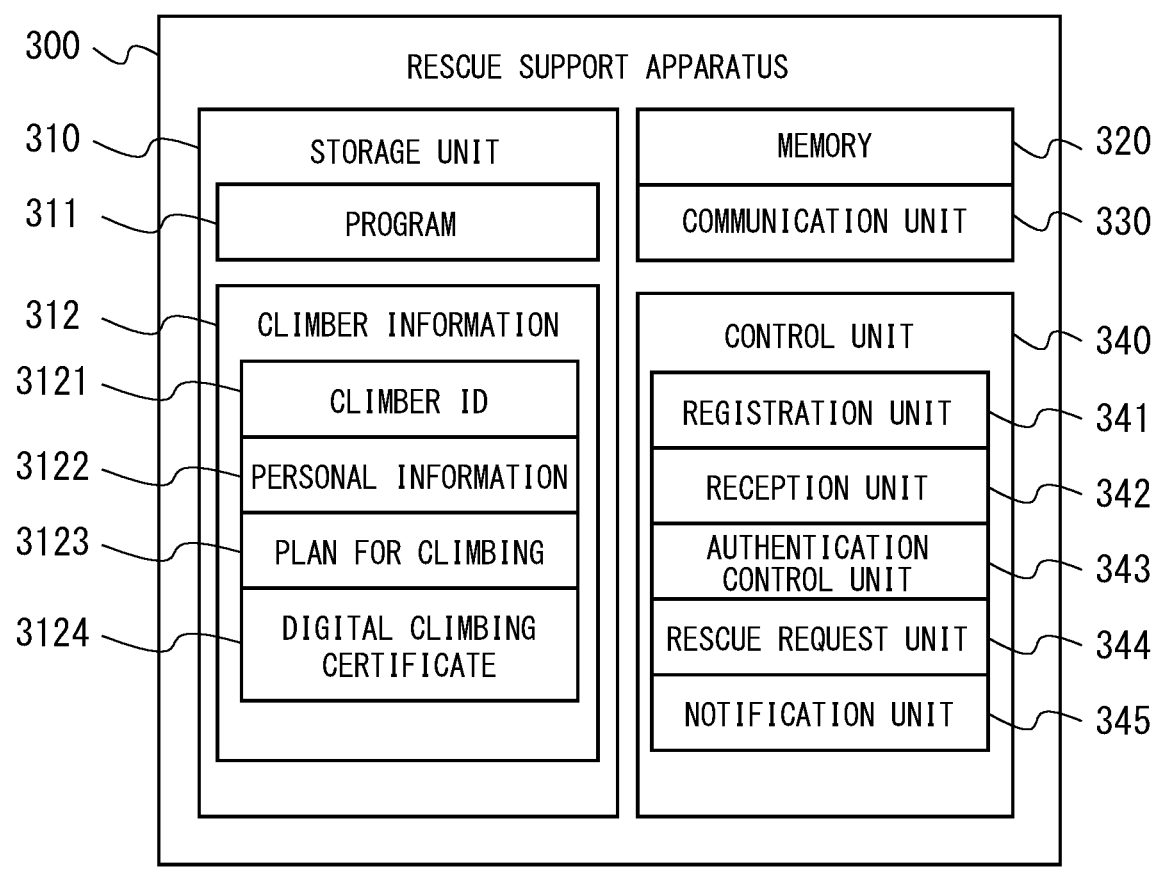
FIG. 6 is a block diagram illustrating a configuration of a rescue support apparatus according to the second example embodiment.

FIG. 6 is a block diagram illustrating a configuration of the rescue support apparatus 300 according to the second example embodiment. The rescue support apparatus 300 includes a storage unit 310, a memory 320, a communication unit 330, and a control unit 340. The storage unit 310 is one example of a storage device such as a hard disk, flash memory, or SSD. The storage unit 310 stores therein a program 311 and climber information 312. The program 311 is one example of a rescue support program, and is a computer program in which processing of the rescue support method according to the second example embodiment is implemented.

The climber information 312 is information for managing users (climbers) of the rescue support system 1000. The climber information 312 is information in which a climber ID 3121, personal information 3122, a plan for climbing 3123, and a digital climbing certificate 3124 are associated with each other. The climber ID 3121 is identification information of a user. The climber ID 3121 is information the same as or uniquely corresponding to the user ID 211, which is managed in the face information DB 210 of the authentication device 200 so as to be associated with the facial feature information 212. For that reason, the climber information 312 can be said to be information associated with the personal authentication information (the biometric information) for registration of a user via the climber ID 3121.

The personal information 3122 contains a name, an age, a gender, a blood type, a past medical history, allergy information, accident insurance information, vaccination information, infectious disease test information, and the like. The personal information 3122 may contain at least one of a blood type, a past medical history, allergy information, vaccination information, and infectious disease test information of a prospective climber. This is because it is particularly useful for preparation of rescue. Further, the accident insurance information contains whether the user has taken out accident insurance or not, an insurance number when the user has taken out accident insurance, and the like. The vaccination information contains a type of vaccine, a vaccination date, an expiration date, and the like. The infectious disease test information contains a type of test, a test date, a test result, an expiration date, and the like.

The plan for climbing 3123 includes a target mountain, a mountain entering date, an area, equipment, and the like. The digital climbing certificate 3124 includes date and time when climbing is permitted, an area, a permitted period, and the like.

The memory 320 is a volatile storage device such as a RAM (Random Access Memory), and is a storage region for temporarily holding information at the time of operation of the control unit 340. The communication unit 330 is a communication interface with the network N.

The control unit 340 is a processor for controlling each configuration of the rescue support apparatus 300, that is, a control device. The control unit 340 loads the program 311 from the storage unit 310 into the memory 320, and executes the program 311. As a result, the control unit 340 realizes functions of a registration unit 341, a reception unit 342, an authentication control unit 343, a rescue request unit 344, and a notification unit 345.

The registration unit 341 is one example of the registration unit 11 described above. The registration unit 341 executes the advance registration processing and the digital climbing certificate issuance processing. The registration unit 341 registers the registration information received by the reception unit 342 in the advance registration processing. Specifically, the registration unit 341 causes the face image contained in the registration information to be contained in a face information registration request to transmit it to the authentication device 200, and receives the user ID issued in the authentication device 200. Then, the registration unit 341 sets the received user ID to the climber ID 3121; associates it with the personal information 3122 and the plan for climbing 3123 contained in the registration information to generate the climber information 312; and stores the climber information 312 in the storage unit 310. Further, the registration unit 341 returns the fact that the registration is completed to the information terminal 100. Note that medical information in the personal information 3122, such as the past medical history and the allergy information is not limited to those in a case where they are inputted from the prospective climber U1, and those acquired from online medical examination data of the prospective climber U1 may be used. For example, from the personal information other than the medical information in the information contained in the registration information, the registration unit 341 executes an acquisition request to a server that manages the medical information to acquire the medical information of the person corresponding to the personal information. Then, the server specifies the medical information of the prospective climber from the personal information designated by the acquisition request, and returns it to the registration unit 341. The server that manages the medical information may be one that belong to a medical institute in which online medical examination is performed. In that case, the registration unit 341 can specify a private medical institute from the personal information of the prospective climber, whereby it is possible to register the private medical institute to the climber information so as to contain it in the personal information. In this case, with respect to emergency medical care when the prospective climber becomes a person to be rescued and is rescued, appropriate treatment can be provided in cooperation with the specified medical institute. Note that the registration unit 341 may acquire the medical information from the online medical examination data with the consent of the prospective climber.

The registration unit 341 verifies the plan for climbing 3123 associated with the climber ID 3121 for which the face authentication is succeeded in the digital climbing certificate issuance processing. In other words, the registration unit 341 verifies whether there is any defect in the target mountain, the mountain entering date, the area, and the equipment of the plan for climbing 3123 or not. In a case where the verification is succeeded, the registration unit 341 issues a digital climbing certificate to the prospective climber. Specifically, the registration unit 341 registers the digital climbing certificate 3124 in the climber information 312 so as to be associated with the climber ID 3121 for which the face authentication is succeeded. In addition, in a case where the verification is succeeded, the registration unit 341 returns climbing permission notification to the reception terminal 500.

The reception unit 342 is one example of the reception unit 12 described above. The reception unit 342 receives the registration information from the information terminal 100 in the advance registration processing. Further, the reception unit 342 receives the climbing permission request from the reception terminal 500 in the digital climbing certificate issuance processing. Further, the reception unit 342 receives the rescue request from the portable terminal 600 in the rescue support processing.

The authentication control unit 343 is one example of the authentication control unit 13 described above. The authentication control unit 343 controls the face authentication for the face image included in the climbing permission request or the rescue request received by the reception unit 342. Specifically, the authentication control unit 343 transmits a face authentication request including the face image to the authentication device 200, and receives a face authentication result from the authentication device 200. Then, the authentication control unit 343 determines success or failure of the authentication from the face authentication result received from the authentication device 200. In a case where the authentication is succeeded, the authentication control unit 343 specifies the user ID included in the face authentication result as the climber ID. Note that the authentication control unit 343 may detect a facial area of the user from the face image, and include an image of the facial area in the face authentication request. Alternatively, the authentication control unit 343 may extract facial feature information from the facial area, and include the facial feature information in the face authentication request.

However, as described above, the personal authentication is not limited to the face authentication, and the authentication control unit 343 may be one so long as it controls authentication using the personal authentication information for registration and authentication. In other words, in a case where personal authentication information other than the face image is contained in the climbing permission request or the rescue request, the authentication control unit 343 appropriately controls comparison with the personal authentication information for registration registered in the authentication device or the inside thereof in accordance with a type of the personal authentication information, and executes authentication. Then, in a case where the authentication is succeeded, the authentication control unit 343 specifies the corresponding user ID as the climber ID.

The rescue request unit 344 is one example of the rescue request unit 14 described above. The rescue request unit 344 specifies the personal information 3122 of the person to be rescued U3 from the climber ID 3121 specified by the authentication control unit 343 in the rescue support processing. Then, the rescue request unit 344 generates the rescue request information containing the specified personal information and the positional information contained in the rescue request. Then, the rescue request unit 344 transmits the generated rescue request information to the rescue system 400.

The notification unit 345 notifies the portable terminal 600 of notification information based on a response acquired from the rescue system 400 in response to the rescue request information. Here, the notification information contains an estimated time of arrival when the rescue team U5 arrives at the person to be rescued U3. Further, the notification information contains advice information for the finder U4 until the estimated time of arrival. Namely, the notification unit 345 receives the estimated time of arrival of the rescue team U5 and the advice information from the rescue team U5 from the rescue system 400, and generates notification information containing them to transmit the notification information to the portable terminal 600.

Returning to FIG. 3, the description will be continued.

The rescue system 400 is an information system that executes various kinds of processing for rescuing a person to be rescued on the basis of the rescue request information.

Specifically, the rescue system 400 executes selection of rescue supplies, arrangement of the rescue team US, and calculation of the estimated time of arrival on the basis of the rescue request information. Further, the rescue system 400 receives advice information to the person to be rescued U3 and the finder U4 from the rescue team US. The rescue system 400 returns the estimated time of arrival and the advice information to the rescue support apparatus 300.

Subsequently, the advance registration processing, the digital climbing certificate issuance processing, and the rescue support processing according to the second example embodiment will be described. First, the prospective climber U1 operates the information terminal 100 to register his or her own face image and personal information together with climbing plan information corresponding to the mountain climbing notification before climbing a mountain in advance. For example, the prospective climber U1 may carry out pre-registration via a WEB site provided by the rescue support apparatus 300.

Figure 7:
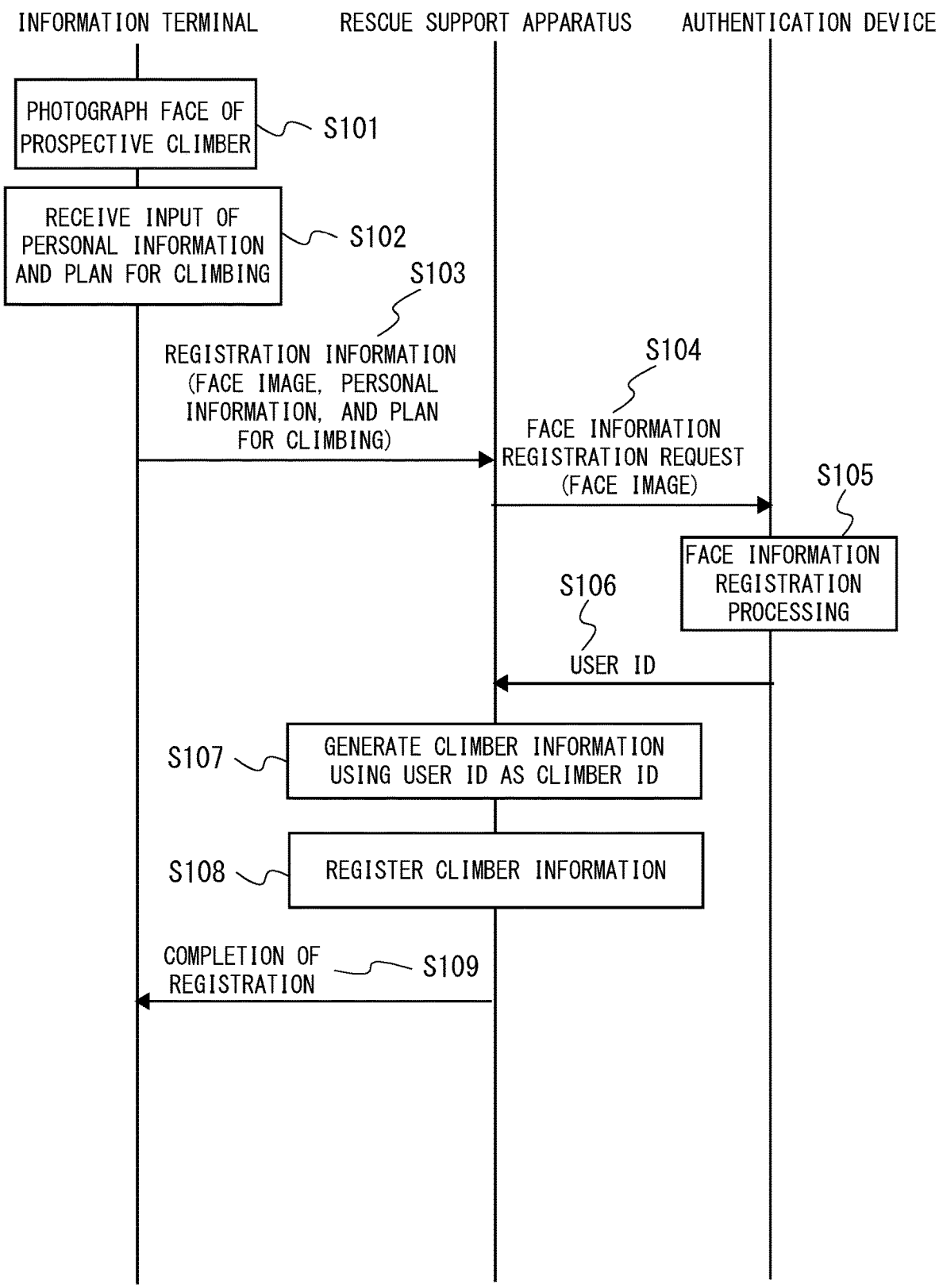
FIG. 7 is a sequence diagram illustrating a flow of advance registration processing according to the second example embodiment.

FIG. 7 is a sequence diagram illustrating a flow of the advance registration processing according to the second example embodiment. First, the information terminal 100 photographs a face of a prospective climber U1 (S101). Further, the information terminal 100 receives an input of personal information and a plan for climbing from the prospective climber U1 (S102). Then, the information terminal 100 transmits registration information containing a face image, the personal information, and the plan for climbing to the rescue support apparatus 300 via the network N (S103).

In response, the reception unit 342 of the rescue support apparatus 300 receives the registration information from the information terminal 100 via the network N. Then, the registration unit 341 acquires the face image from the received registration information, and transmits a face information registration request including the face image to the authentication device 200 via the network N (S104). The authentication device 200 executes face information registration processing in response to reception of the face information registration request (S105).

Figure 8:
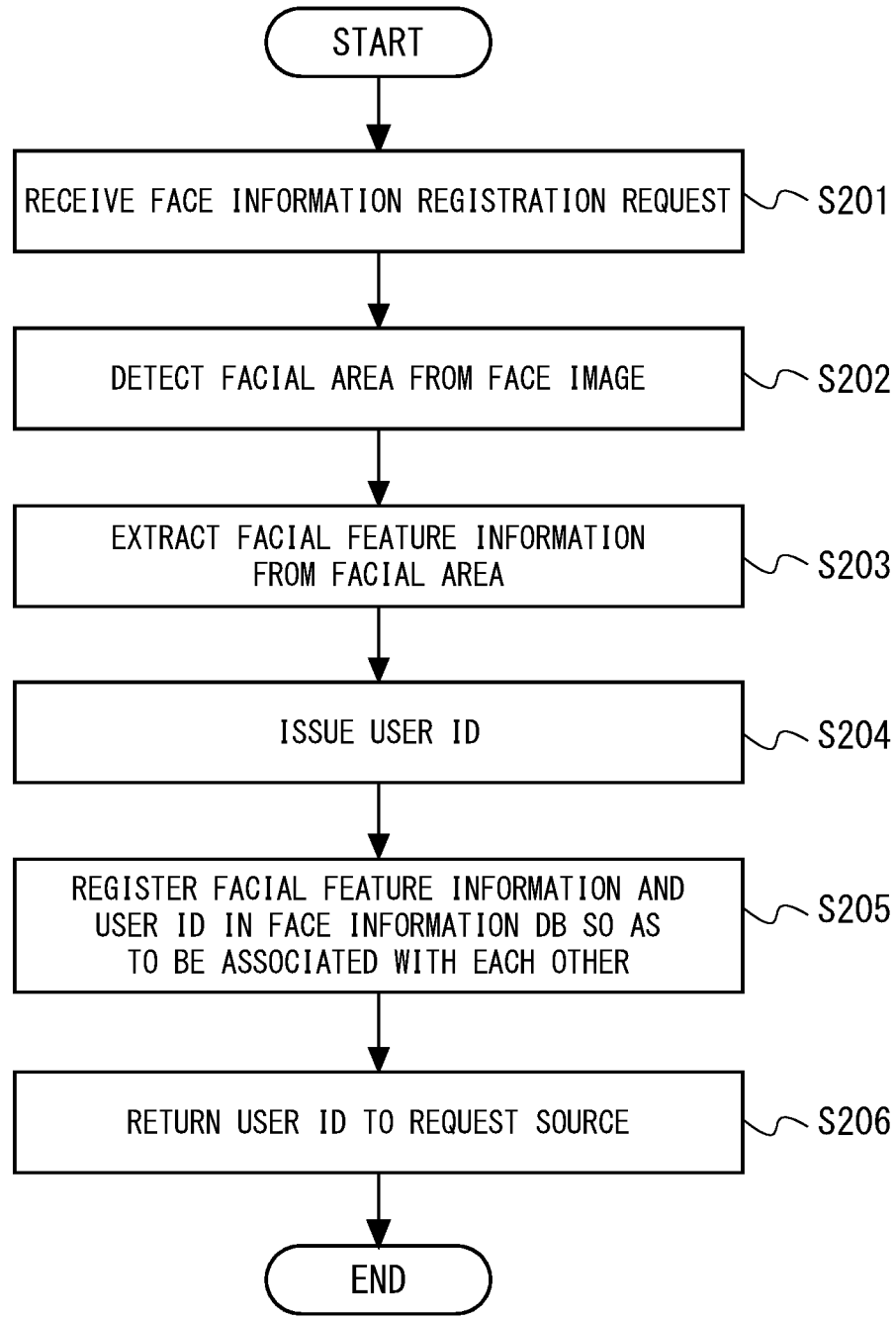
FIG. 8 is a flowchart illustrating a flow of face information registration processing by the authentication device according to the second example embodiment.

FIG. 8 is a flowchart illustrating a flow of the face information registration processing by the authentication device according to the second example embodiment. Here, an information registration terminal (not illustrated in the drawings) photographs a body including a face of a user, and transmits a face information registration request including a photographed image (registered image) to the authentication device 200 via the network N. The information registration terminal is an information processing apparatus such as a personal computer, a smartphone, or a tablet terminal, for example. For example, the information registration terminal may be the information terminal 100 or the like. Here, it is assumed that the information registration terminal is the rescue support apparatus 300 that receives a registration request from the information terminal 100 or the like.

First, the authentication device 200 receives the face information registration request (S201). For example, the authentication device 200 receives the face information registration request from the rescue support apparatus 300 via the network N. Next, the face detection unit 220 detects a facial area from a face image included in the face information registration request (S202). Then, the feature point extraction unit 230 extracts a feature point (facial feature information) from the facial area detected at Step S202 (S203). Then, the registration unit 240 issues a user ID 211 (S204). Then, the registration unit 240 registers the extracted facial feature information 212 and the issued user ID 211 in the face information DB 210 so as to be associated with each other (S205). Then, the registration unit 240 returns the issued user ID 211 to a request source (the information registration terminal, for example, the rescue support apparatus 300) (S206).

Returning to FIG. 7, the description will be continued. The registration unit 341 of the rescue support apparatus 300 receives a user ID issued in response to registration of face information from the authentication device 200 (S106). Then, the registration unit 341 sets the received user ID as the climber ID 3121, and associates it with the personal information 3122 and the plan for climbing 3123 contained in the registration information received at Step S103 to generate the climber information 312 (S107). Then, the registration unit 341 registers the climber information 312 in the storage unit 310 (S108). Further, the registration unit 341 returns the fact that the registration is completed to the information terminal 100 via the network N (S109). In response, the information terminal 100 may display the received fact that the registration is completed on a screen thereof.

Figure 9:
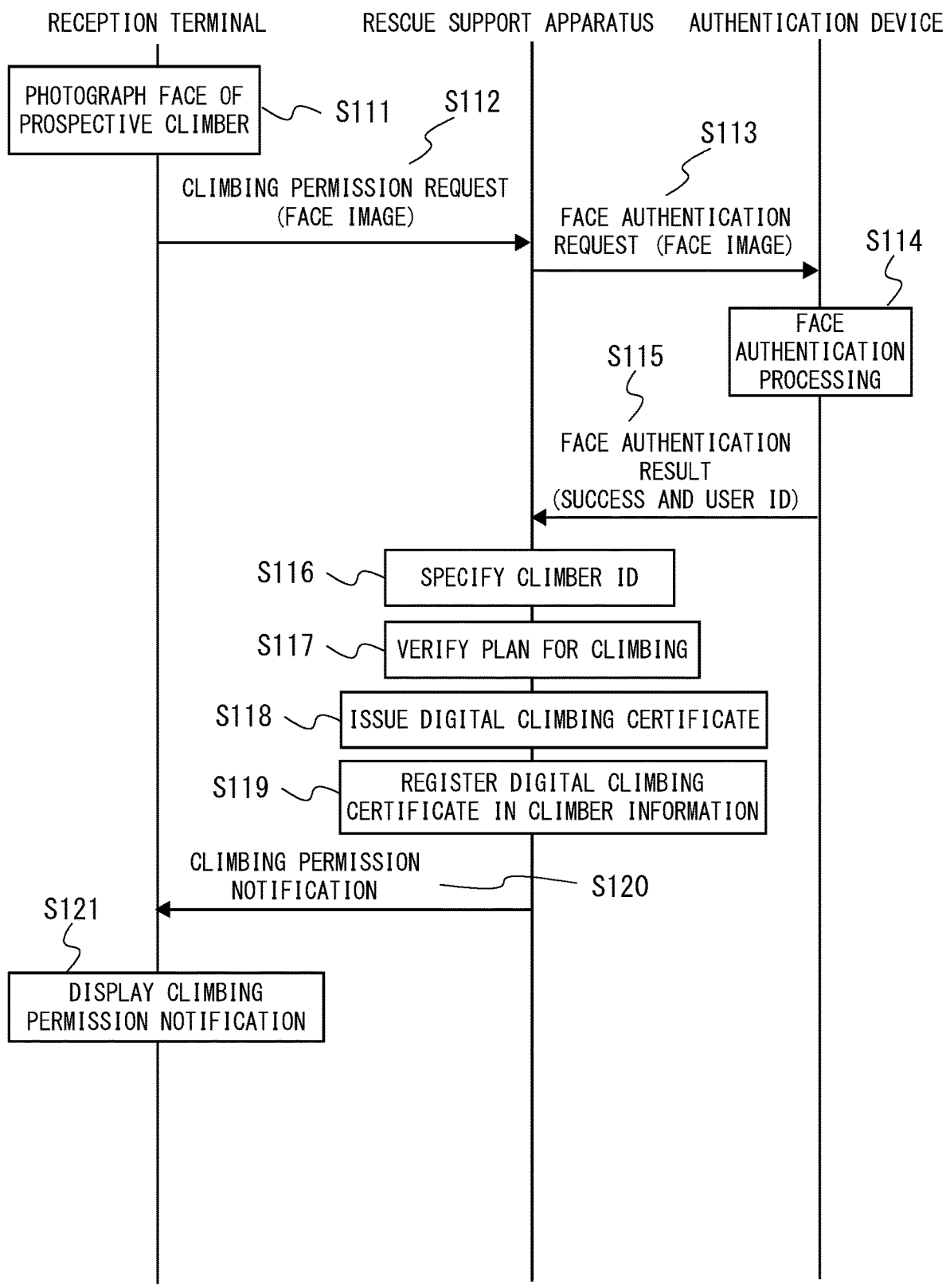
FIG. 9 is a sequence diagram illustrating a flow of digital climbing certificate issuance processing according to the second example embodiment.

Next, the prospective climber U2 who carried out pre-registration arrives at a starting point for climbing 5, and carries out authentication to the reception terminal 500. FIG. 9 is a sequence diagram illustrating a flow of digital climbing certificate issuance processing according to the second example embodiment. First, the reception terminal 500 photographs a face of the prospective climber U2 (S111). Then, the reception terminal 500 transmits a climbing permission request including a face image to the rescue support apparatus 300 via the network N (S112).

In response, the reception unit 342 of the rescue support apparatus 300 receives the climbing permission request from the reception terminal 500 via the network N. Then, the authentication control unit 343 transmits a face authentication request including the face image included in the climbing permission request to the authentication device 200 via the network N (S113). The authentication device 200 executes face authentication processing in response to reception of the face authentication request (S114).

Figure 10:
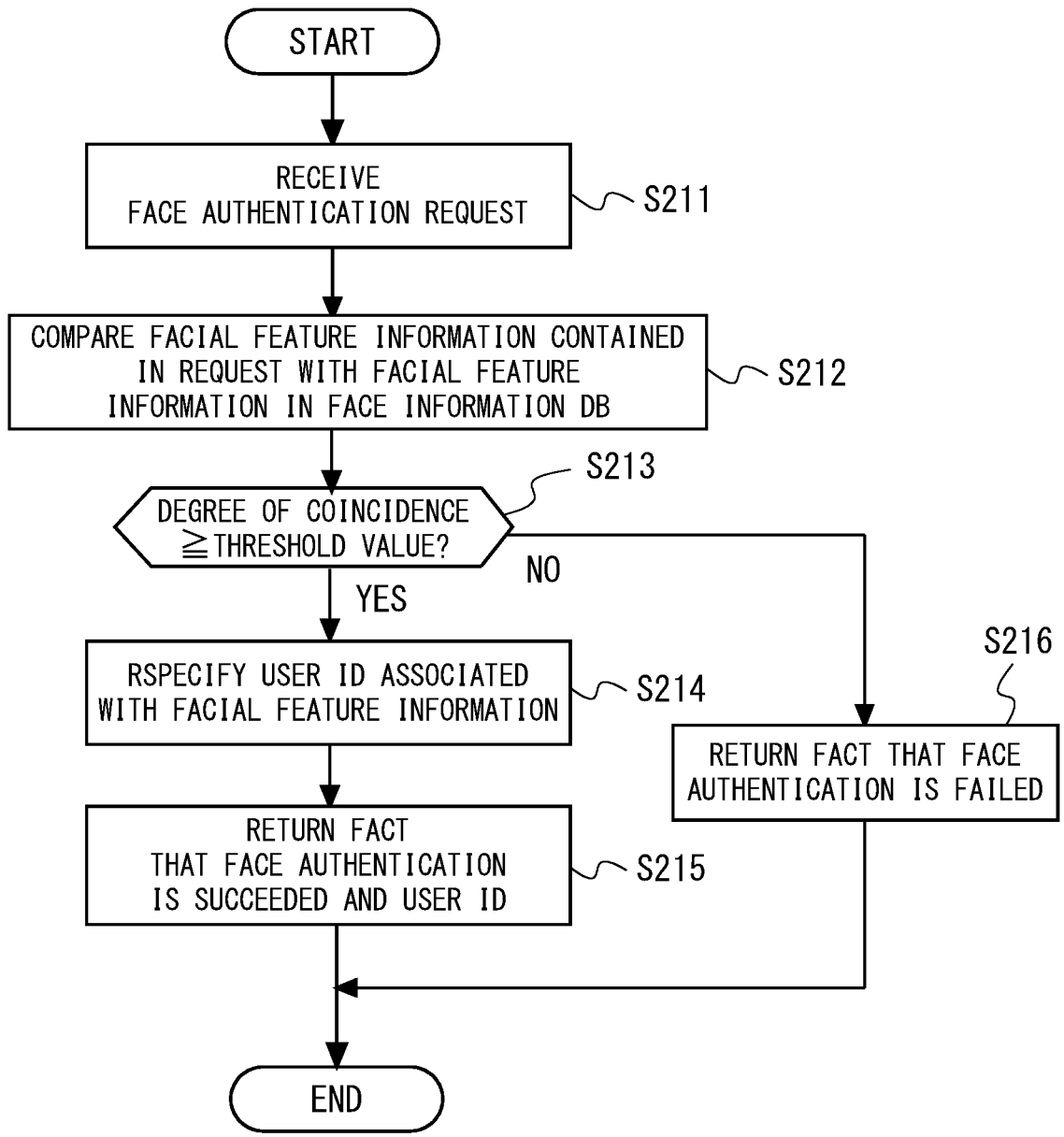
FIG. 10 is a flowchart illustrating a flow of face authentication processing by the authentication device according to the second example embodiment.

FIG. 10 is a flowchart illustrating a flow of face authentication processing by the authentication device according to the second example embodiment. First, the authentication device 200 receives a face authentication request from the rescue support apparatus 300 via the network N (S211). Note that the authentication device 200 may receive the face authentication request from the reception terminal 500 or the like. Next, the authentication device 200 extracts facial feature information from a face image included in the face authentication request as well as Steps S202 and S203 described above. Then, the authentication unit 250 of the authentication device 200 compares the facial feature information extracted from the face image included in the face authentication request with the facial feature information 212 of the face information DB 210 (S212) to calculate the degree of coincidence. Then, the authentication unit 250 determines whether the degree of coincidence is equal to or more than the threshold value or not (S213). In a case where the facial feature information matches, in other words, in a case where it is determined that the degree of coincidence of the facial feature information is equal to or more than the threshold value, the authentication unit 250 specifies a user ID 211 associated with the facial feature information 212 (S214). Then, the authentication unit 250 returns a face authentication result including the fact that the face authentication is succeeded and the specified user ID 211 to the rescue support apparatus 300 via the network N (S215). In a case where it is determined at Step S213 that the degree of coincidence is less than the threshold value, the authentication unit 250 returns a face authentication result including the fact that the face authentication is failed to the rescue support apparatus 300 via the network N (S216).

Returning to FIG. 9, the description will be continued. The authentication control unit 343 of the rescue support apparatus 300 receives the face authentication result from the authentication device 200 via the network N (S115). Then, the authentication control unit 343 determines whether the face authentication is succeeded or not on the basis of the received face authentication result. In a case where it is determined that the face authentication is succeeded, the authentication control unit 343 specifies the user ID included in the face authentication result as a climber ID (S116). On the other hand, in a case where it is determined that the face authentication is failed, the rescue support apparatus 300 returns the fact that the mountain climbing is not permitted to the reception terminal 500.

Here, the description will be continued in a case where it is assumed that the face authentication is succeeded. In this case, the registration unit 341 verifies the plan for climbing 3123 associated with the climber ID 3121 for which the face authentication is succeeded (S117). Specifically, the registration unit 341 verifies whether a target mountain of the plan for climbing 3123 is a mountain that can be entered from the starting point for climbing 5 or not, whether an area is an area where mountain climbing is currently permitted or not, whether a mountain entering date is current date or not, and whether equipment is suitable for the season and the mountain or not. In a case where the verification is succeeded, the registration unit 341 issues a digital climbing certificate to the prospective climber (S118). Specifically, the registration unit 341 issues the digital climbing certificate including date and time when the mountain climbing is permitted as the current date, an area where the mountain climbing is permitted, and a permitted period. Then, the registration unit 341 associates the digital climbing certificate 3124 with the climber ID 3121 for which the face authentication is succeeded, and registers it in the climber information 312 (S119). Then, the registration unit 341 returns a climbing permission notification to the reception terminal 500 via the network N (S120). In response, the reception terminal 500 displays the received climbing permission notification on a screen thereof (S121). Thereafter, the prospective climber U2 can display the digital climbing certificate on his or her terminal (not illustrated in the drawings) to confirm it.

Then, the prospective climber U2 enters the mountain from the starting point for climbing 5 to start climbing the mountain. In other words, the prospective climber U2 becomes a climber. Then, it is assumed that the climber is caught in an avalanche at an avalanche point 6 during mountain climbing to be incapable of moving, thereby becoming a person to be rescued U3. Then, it is also assumed that the finder U4 who is another climber finds the person to be rescued U3 at the avalanche point 6.

Figure 11:
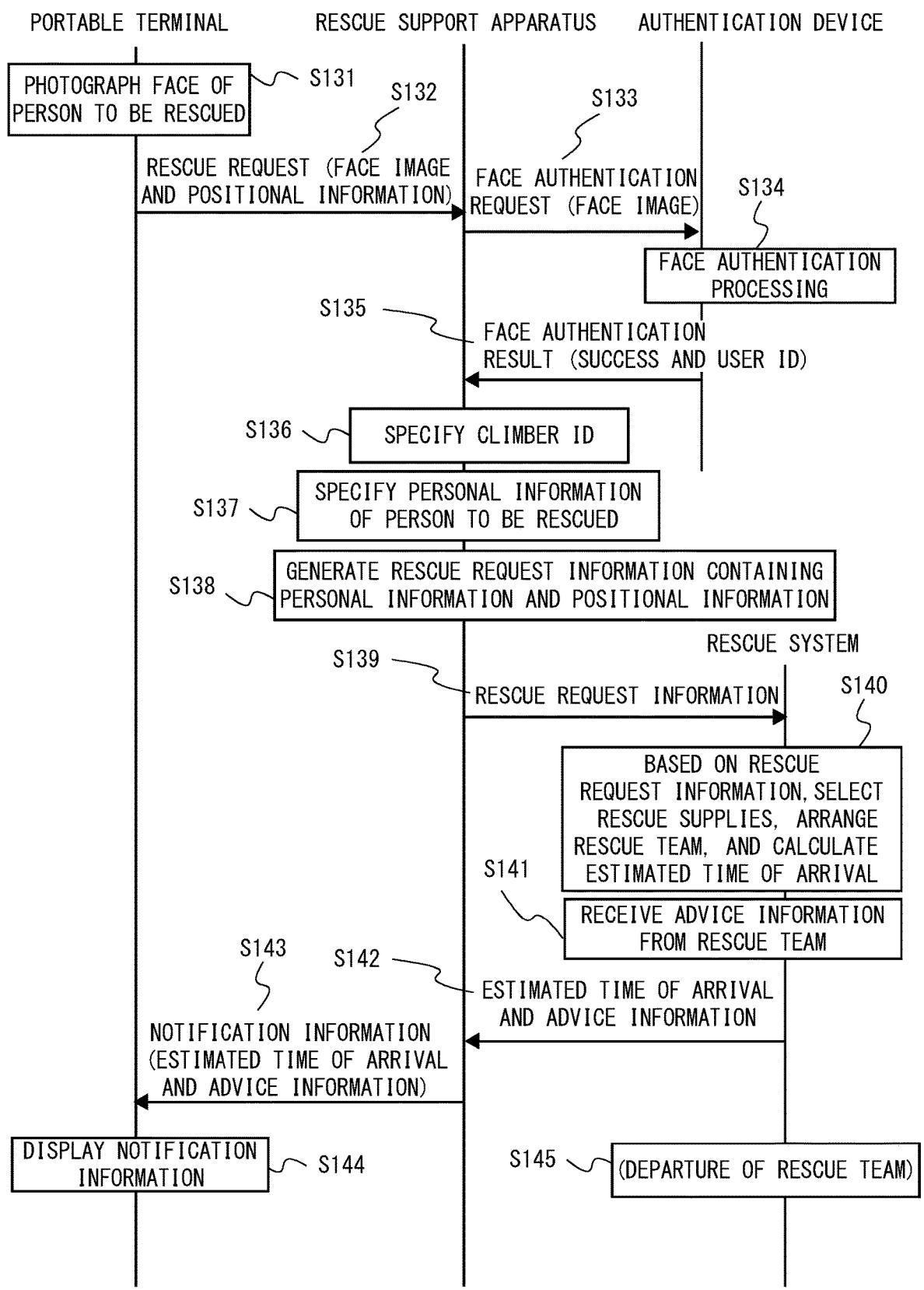
FIG. 11 is a sequence diagram illustrating a flow of rescue support processing according to the second example embodiment.

FIG. 11 is a sequence diagram illustrating a flow of rescue support processing according to the second example embodiment. First, the portable terminal 600 photographs a face of a person to be rescued U3 in response to an operation of the finder U4 (S131). Then, the finder U4 carries out an operation for a rescue request using the portable terminal 600. At this time, the portable terminal 600 acquires the latest positional information. For example, the portable terminal 600 reads out positional information that has been stored in the storage unit 650 or the memory 670, or receives positional information from GPS satellites. Then, the portable terminal 600 transmits a rescue request including the face image and the latest positional information to the rescue support apparatus 300 via the network N (S132).

In response, the reception unit 342 of the rescue support apparatus 300 receives the rescue request from the portable terminal 600 via the network N. Then, the authentication control unit 343 transmits a face authentication request including the face image included in the rescue request to the authentication device 200 via the network N (S133). The authentication device 200 executes face authentication processing in response to reception of the face authentication request as well as FIG. 10 described above (S134).

The authentication control unit 343 receives a face authentication result from the authentication device 200 via the network N (S135). Then, the authentication control unit 343 determines whether face authentication is succeeded or not on the basis of the received face authentication result. Here, the description will be continued in a case where it is assumed that the face authentication is succeeded. For that reason, the authentication control unit 343 specifies a user ID included in the face authentication result as a climber ID (S136).

The rescue request unit 344 specifies the personal information 3122 of the person to be rescued U3 from the specified climber ID 3121 (S137). Then, the rescue request unit 344 generates rescue request information containing the specified personal information and the positional information included in the rescue request (S138). Then, the rescue request unit 344 transmits the generated rescue request information to the rescue system 400 via the network N (S139).

In response, the rescue system 400 receives the rescue request information from the rescue support apparatus 300 via the network N. Then, on the basis of the rescue request information, the rescue system 400 executes selection of rescue supplies, arrangement of a rescue team U5, and calculation of an estimated time of arrival (S140). Specifically, the rescue system 400 selects rescue supplies from the personal information contained in the rescue request information. For example, in a case where the person to be rescued U3 is bleeding, the rescue system 400 selects blood packs for transfusion from a blood type of the person to be rescued U3. Further, the rescue system 400 selects medical supplies (medicine and the like) that may be needed by taking into consideration a past medical history and allergy information of the person to be rescued U3. Further, the rescue system 400 selects equipment of the rescue team U5 from vaccination information and infectious disease test information of the person to be rescued U3. Then, the rescue system 400 arranges the rescue team U5 with an appropriate number of members each having an appropriate experience on the basis of information on the selected rescue supplies and the like and the positional information contained in the rescue request information. In other words, the rescue system 400 transmits a dispatch request for the rescue team U5 to a police station, a fire station, a rescue team office, and the like. Further, the rescue system 400 calculates a time required for movement from a departure point of the rescue team U5 to be arranged to the positional information contained in the rescue request information, and estimates an estimated time of arrival.

Further, the rescue system 400 receives advice information for the person to be rescued U3 and the finder U4 from the arranged rescue team U5 (S141). For example, the advice information is a message for encouraging the person to be rescued U3 until arrival of the rescue team U5, measures to ask the finder U4 for the person to be rescued U3 until arrival of the rescue team U5, and the like. Further, the rescue system 400 may receive the question content about a condition of the person to be rescued U3 or a surrounding situation from the rescue team U5 to the person to be rescued U3 and the finder U4.

Then, the rescue system 400 responds to the rescue support apparatus 300 via the network N with the estimated time of arrival and the advice information (and the question content) (S142). Then, the notification unit 345 of the rescue support apparatus 300 receives the response from the rescue system 400 via the network N, and generates notification information containing the estimated time of arrival and the advice information (and the question content). Then, the notification unit 345 transmits the generated notification information to the portable terminal 600 via the network N (S143). In response, the portable terminal 600 receives the notification information from the rescue support apparatus 300 via the network N, and displays the notification information on a screen (S144). Note that the portable terminal 600 may reproduce part of the notification information by voice. Further, after Step S142, the rescue team US prepares the selected rescue supplies and the equipment, and departs toward the avalanche point 6 based on the positional information (S145). Then, the rescue team US rescues the person to be rescued U3 after arriving at the avalanche point 6. This makes it possible to realize first aid by the rescue team US more appropriately and more speedily.

Note that, in parallel with first aid, the rescue support apparatus 300 or the rescue system 400 may provide personal information of the person to be rescued U3 to the medical institute to which the rescue team US transports the person to be rescued U3. In other words, the rescue support apparatus 300 may provide information on the name, the age, the gender, the blood type, the past medical history, the allergy information, the accident insurance information, the vaccination information, and the infectious disease test information of the person to be rescued U3 to the destination medical institute. This makes it possible to take appropriate and speedy measures at the destination medical institute.

Further, in the present example embodiment, the personal information of the person to be rescued U3 is not disclosed to the portable terminal 600 of the finder U4. For that reason, privacy of the person to be rescued U3 can be protected appropriately.

Third Example Embodiment

A third example embodiment is a modification example of the second example embodiment described above. A reception unit 342 of a rescue support apparatus 300 according to the third example embodiment further receives supplementary information, which is acquired by a portable terminal 600 in response to an operation of a finder U4, from the portable terminal 600. Then, a rescue request unit 344 transmits rescue request information further containing the received supplementary information to a rescue system 400. This makes it possible for the rescue system to grasp a situation of a person to be rescued U3 more accurately. Therefore, it is possible to take more appropriate rescue measures.

Here, the supplementary information may contain an image obtained by photographing surroundings where the person to be rescued U3 was found. This makes it possible to appropriately grasp current weather and the like at a location where the person to be rescued U3 exists. Further, the supplementary information may contain an image in which parts other than his or her face of the person to be rescued U3 are photographed. As a result, it becomes easier to grasp a physical condition of the person to be rescued U3, such as a state of injury, and presence or absence of bleeding. Further, the supplementary information may contain text data or voice data inputted by the finder U4 with respect to a state of the person to be rescued U3 or surroundings where the person to be rescued U3 was found. As a result, it becomes easier to grasp direct and appropriate information (a situation of circumstances and his or her state of health) from the finder U4.

Note that sine a rescue support system according to the third example embodiment is equivalent to the rescue support system 1000 according to the second example embodiment, redundant descriptions and illustration thereof will be omitted as appropriate.

Figure 12:
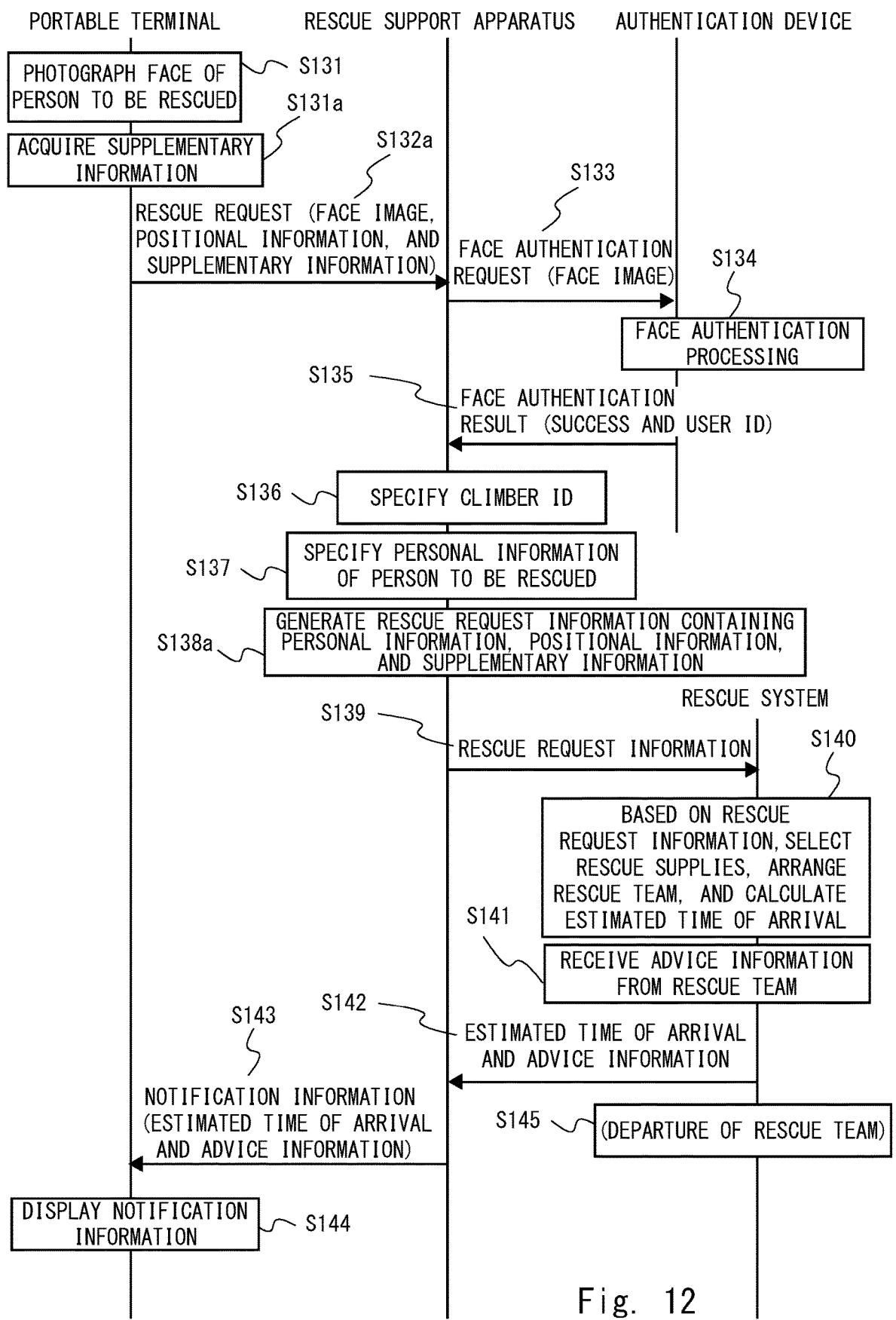
FIG. 12 is a sequence diagram illustrating a flow of rescue support processing according to a third example embodiment.

FIG. 12 is a sequence diagram illustrating a flow of rescue support processing according to the third example embodiment. Hereinafter, the description will focus on the differences from FIG. 11 described above. After the finder U4 photographs the face of the person to be rescued U3 using the portable terminal 600 at Step S131, the finder U4 inputs supplementary information. Namely, the portable terminal 600 acquires the supplementary information from the finder U4 (S131a). For example, the finder U4 photographs a surrounding situation where the person to be rescued U3 is found using the portable terminal 600. Then, the portable terminal 600 acquires the supplementary information as a photographed image of the surrounding situation. Further, the finder U4 uses the portable terminal 600 to photograph parts other than the face of the person to be rescued U3 (for example, injured parts or bleeding parts). Then, the portable terminal 600 acquires the supplementary information as an image obtained by photographing the parts of a body other than the face of the person to be rescued U3. Further, the finder U4 inputs, as a text, information related to a state (or a condition) of the person to be rescued U3 or the surroundings where the person to be rescued U3 was found into the portable terminal 600. Alternatively, the finder U4 inputs the information into the portable terminal 600 by voice. Then, the portable terminal 600 acquires information related to the state (or the condition) of the person to be rescued U3 or the surroundings where the person to be rescued U3 was found as text data or voice data.

Then, the portable terminal 600 transmits a rescue request containing the supplementary information together with a face image and the latest positional information to the rescue support apparatus 300 via the network N (S132a). Hereinafter, as well as FIG. 11 described above, Steps S133 to S137 are executed. Then, the rescue request unit 344 generates rescue request information further containing the supplementary information in addition to the specified personal information and the positional information contained in the rescue request (S138a). Hereinafter, as well as FIG. 11 described above, Steps S139 to S144 are executed. As a result, the rescue system 400 can take into account the received supplementary information to more accurately grasp circumstances and a condition of the person to be rescued U3. In particular, the rescue system 400 can grasp the condition of injury in detail by the supplementary information. Therefore, it is possible to appropriately select medical supplies (medicine and the like) to be brought by a rescue team.

For example, it is assumed that the finder U4 finds the person to be rescued U3 after the person to be rescued U3 collides with a standing tree while skiing. At this time, the finder U4 listens to the condition of the person to be rescued U3 while giving first aid in a state where the person to be rescued U3 is conscious. At this time, the finder U4 uses the portable terminal 600 to photograph an injured part of the person to be rescued U3, and inputs a comment on the condition into the portable terminal 600 by text or voice. In addition, the finder U4 uses the portable terminal 600 to photograph his or her face of the person to be rescued U3 for face authentication. For that reason, the finder U4 can accurately inform the rescue support apparatus 300 or the rescue system 400 of the condition even though it is the first meeting with the person to be rescued U3.

Further, in a case where the person to be rescued U3 is buried in an avalanche during a mountain climbing tour, a tour guide (the finder U4) digs out the person to be rescued U3 from avalanche search, and uses the portable terminal 600 to photograph the face of the person to be rescued U3 for face authentication. At this time, if the person to be rescued U3 is unconscious, the finder U4 can input into the portable terminal 600 that the person to be rescued U3 is unconscious as supplementary information.

Further, it is assumed that the finder U4 finds the person to be rescued U3 in a conscious state after the person to be rescued U3 has fallen into a mountain stream. At this time, the finder U4 is separated from the person to be rescued U3 (for example, about 12 m); asks the person to be rescued U3 to take off his or her goggles; and uses the camera 610 of the portable terminal 600 to photograph the face of the person to be rescued U3 in a magnified manner. Further, the finder U4 separately photographs surroundings in a state where the person to be rescued U3 falls into the mountain stream.

As a result, the rescue system 400 side can accurately grasp, through the photographed images, visibility (the degree of fog or snowstorm), weather, the degree of avalanche, the number and spacing of trees in the surroundings, the scenery, and the like of the surroundings of the place where the person to be rescued U3 exists. Further, the rescue system 400 side can accurately grasp, through the photographed images, whether the person to be rescued U3 has slid down into a valley or not, inclination of the place where the person to be rescued U3 exists, and the like. For example, the rescue system 400 side can accurately grasp a situation such as how deep the person to be rescued U3 has fallen into the mountain stream. Therefore, the rescue team can appropriately select and prepare the tools and equipment for rescue from the mountain stream, and then head for rescue. Further, the rescue system 400 side can accurately grasp, through the photographed images, a state of the injured part of the person to be rescued U3, presence or absence and the degree of bleeding, whether there is any abnormality in the body or not, whether the person to be rescued U3 is buried in an avalanche or not, and the like. Further, the rescue system 400 side can accurately grasp the situation and the condition of the surroundings of the person to be rescued U3 through text data or voice data contained in the supplementary information. For that reason, the rescue system 400 side can take more appropriate measures, and contribute to rescue support.

Another Example Embodiment

Note that the rescue support apparatus according to each of the example embodiments described above may analyze places, time zones that are frequently rescued, attributes of climbers, and the like on the basis of a rescue history, and provide information on an analysis result to the climbers, the rescue team, the rescue system, and the like. In this case, it is assumed that the rescue history is accumulated in the rescue support apparatus or the other storage device. By utilizing past rescue cases in this manner, it is possible to support the rescue effectively.

Further, the rescue support apparatus or the other storage device may store the rescue history in association with the individual (climber ID). In this case, in a case where a registration unit of the rescue support apparatus receives a mountain climbing notification (registration information) from a prospective climber, the registration unit determines whether the prospective climber has already been registered in the climber information or not on the basis of a face image or personal information contained in the registration information. Then, in a case where it is determined that it has already been registered, the registration unit refers to the rescue history described above to specify whether the prospective climber has been rescued in the past or not and the degree of rescue. Then, in accordance with the specified information, the registration unit may conditionally give climbing permission to the prospective climber, or alert the other climbers, the rescue team, the rescue system, and the like. This makes it possible to carry out rescue more quickly and appropriately.

Note that in the second and third example embodiments described above, the rescue support apparatus 300 and the authentication device 200 are explained as separate information processing apparatuses, but they may be the same. For example, the rescue support apparatus 300 may register the facial feature information so as to be further associated with the climber ID 3121 of the climber information 312. In that case, the control unit 340 may include the face detection unit 220, the feature point extraction unit 230, the registration unit 240, and the authentication unit 250 illustrated in FIG. 4.

In the examples described above, a program contains instructions (or software code) that, when read into a computer, cause the computer to execute one or more functions described in the example embodiments. The program may be stored in a non-transitory computer readable medium or tangible storage medium. By way of example, and not limitation, the computer readable media or tangible storage media may include random-access memories (RAMs), read-only memories (ROMs), flash memories, solid-state drives (SSD) or other memory technology, CD-ROMs, digital versatile discs (DVD), Blu-ray discs, or other optical disc storages, magnetic cassettes, magnetic tapes, magnetic disc storages or other magnetic storage devices. The program may be transmitted on a transitory computer readable medium or communication medium. By way of example, and not limitation, the transitory computer readable medium or communication medium includes electrical, optical, acoustic, or other forms of propagated signals.

Note that the present disclosure is not limited to the example embodiments described above, and can be modified as appropriate without departing from the spirit and scope of the present disclosure. Further, the present disclosure may be implemented by appropriately combining the respective example embodiments.

A part or all of the example embodiments described above can be described as Supplementary Notes described below, but are not limited to the followings.

(Supplementary Note A1)

A rescue support apparatus comprising:
registration means configured to register biometric information and personal information of a prospective climber so as to be associated with each other;
reception means configured to receive an image and positional information of a terminal of an arbitrary finder from the terminal in a case where the arbitrary finder finds a person to be rescued during mountain climbing, the image being obtained by photographing biometric information of the person to be rescued by the terminal of the finder;

authentication control means configured to control authentication using the registered biometric information for the biometric information contained in the image; and rescue request means configured to transmit rescue request information to a rescue system in a case where the authentication is succeeded, the rescue request information containing the personal information associated with the biometric information and the positional information received from the terminal.

(Supplementary Note A2)

The rescue support apparatus according to Supplementary Note A1, wherein the reception means is further configured to receive supplementary information acquired by the terminal from the terminal in response to an operation of the finder, and wherein the rescue request means is further configured to transmit the rescue request information in which the supplementary information is further contained.

(Supplementary Note A3)

The rescue support apparatus according to Supplementary Note A2, wherein the supplementary information contains an image obtained by photographing surroundings where the person to be rescued was found.

(Supplementary Note A4)

The rescue support apparatus according to Supplementary Note A2 or A3, wherein the supplementary information contains an image obtained by photographing parts other than a face of the person to be rescued.

(Supplementary Note A5)

The rescue support apparatus according to any one of Supplementary Notes A2 to A4, wherein the supplementary information contains text data or voice data inputted by the finder regarding a state of the person to be rescued or surroundings where the person to be rescued is found.

(Supplementary Note A6)

The rescue support apparatus according to any one of Supplementary Notes A1 to A5, wherein the personal information contains at least one of a blood type, a past medical history, allergy information, vaccination information, or infectious disease test information of the prospective climber.

(Supplementary Note A7)

The rescue support apparatus according to any one of Supplementary Notes A1 to A6, further comprising:

notification means configured to notify the terminal of notification information based on a response acquired from the rescue system in response to the rescue request information.

(Supplementary Note A8)

The rescue support apparatus according to Supplementary Note A7, wherein the notification information contains an estimated time when a rescue team arrives at the person to be rescued.

(Supplementary Note A9)

The rescue support apparatus according to Supplementary Note A8, wherein the notification information contains advice information for the finder until the estimated time.

(Supplementary Note A10)

The rescue support apparatus according to any one of Supplementary Notes A1 to A9, wherein the registration means is further configured to:

register a plan for climbing of the prospective climber so as to be further associated with the biometric information;

verify the plan for climbing associated with the biometric information in a case where the prospective climber succeeds the authentication by the authentication control means at a time of start of the mountain climbing;

issue a digital climbing certificate to the prospective climber in a case where the verification is succeeded; and register the digital climbing certificate so as to be further associated with the biometric information.

(Supplementary Note B1)

A rescue support system comprising:

a portable terminal carried by a predetermined person; and a rescue support apparatus, wherein the rescue support apparatus is configured to:

register biometric information and personal information of a prospective climber so as to be associated with each other, wherein the portable terminal is configured to:

photograph an image containing biometric information of a person to be rescued in a case where the predetermined person finds the person to be rescued during mountain climbing; and transmit the image and positional information of the portable terminal to the rescue support apparatus, wherein the rescue support apparatus is further configured to:

control authentication using the registered biometric information for the biometric information contained in the image received from the portable terminal; and transmit rescue request information to a rescue system in a case where the authentication is succeeded, the rescue request information containing the personal information associated with the biometric information and the positional information received from the portable terminal.

(Supplementary Note B2)

The rescue support system according to Supplementary Note B1, wherein the rescue support apparatus is further configured to:

receive supplementary information acquired by the portable terminal from the portable terminal in response to an operation of the person; and transmit the rescue request information in which the supplementary information is further contained.

(Supplementary Note C1)

A rescue support method executed by a computer, the rescue support method comprising:

registering biometric information and personal information of a prospective climber so as to be associated with each other;

receiving an image and positional information of a terminal of an arbitrary finder from the terminal in a case where the arbitrary finder finds a person to be rescued during mountain climbing, the image being obtained by photographing biometric information of the person to be rescued by the terminal of the finder;

controlling authentication using the registered biometric information for the biometric information contained in the image; and transmitting rescue request information to a rescue system in a case where the authentication is succeeded, the rescue request information containing the personal information associated with the biometric information and the positional information received from the terminal.

(Supplementary Note D1)

A non-transitory computer readable medium in which a rescue support program is stored, the rescue support program causing a computer to execute:

registration processing configured to register biometric information and personal information of a prospective climber so as to be associated with each other;

reception processing configured to receive an image and positional information of a terminal of an arbitrary finder from the terminal in a case where the arbitrary finder finds a person to be rescued during mountain climbing, the image being obtained by photographing biometric information of the person to be rescued by the terminal of the finder;

authentication control processing configured to control authentication using the registered biometric information for the biometric information contained in the image; and rescue request processing configured to transmit rescue request information to a rescue system in a case where the authentication is succeeded, the rescue request information containing the personal information associated with the biometric information and the positional information received from the terminal.

As described above, the present invention has been described with reference to the example embodiments (and the examples), but the present invention is not limited to the example embodiment (and the examples) described above. Various modifications that can be understood by a person having ordinary skill in the art can be made to the configurations and the details of the present invention within the scope of the present invention.

REFERENCE SIGNS LIST

1 RESCUE SUPPORT APPARATUS
11 REGISTRATION UNIT
12 RECEPTION UNIT
13 AUTHENTICATION CONTROL UNIT
14 RESCUE REQUEST UNIT
1000 RESCUE SUPPORT SYSTEM
N NETWORK
U1 PROSPECTIVE CLIMBER
U2 PROSPECTIVE CLIMBER
U3 PERSON TO BE RESCUED
U4 FINDER
U5 RESCUE TEAM
100 INFORMATION TERMINAL
200 AUTHENTICATION DEVICE
210 FACE INFORMATION DB
211 USER ID
212 FACIAL FEATURE INFORMATION
220 FACE DETECTION UNIT
230 FEATURE POINT EXTRACTION UNIT
240 REGISTRATION UNIT
250 AUTHENTICATION UNIT
300 RESCUE SUPPORT APPARATUS
310 STORAGE UNIT
311 PROGRAM
312 CLIMBER INFORMATION
3121 CLIMBER ID
3122 PERSONAL INFORMATION
3123 PLAN FOR CLIMBING
3124 DIGITAL CLIMBING CERTIFICATE
320 MEMORY
330 COMMUNICATION UNIT
340 CONTROL UNIT
341 REGISTRATION UNIT
342 RECEPTION UNIT
343 AUTHENTICATION CONTROL UNIT
344 RESCUE REQUEST UNIT
345 NOTIFICATION UNIT
400 RESCUE SYSTEM
5 STARTING POINT FOR CLIMBING
500 RECEPTION TERMINAL
6 AVALANCHE POINT
600 PORTABLE TERMINAL
610 CAMERA
620 MICROPHONE
630 SPEAKER
640 TOUCH PANEL
650 STORAGE UNIT
651 PROGRAM
660 COMMUNICATION UNIT
670 MEMORY
680 CONTROL UNIT
681 RESCUE REQUEST UNIT
682 DISPLAY CONTROL UNIT

What is claimed is:

1. A rescue support apparatus comprising:
at least one memory configured to store instructions; and
at least one processor configured to execute the instructions to:
register biometric information and personal information of a prospective climber so as to be associated with each other;
receive an image and positional information of a terminal of an arbitrary finder from the terminal in a case where the arbitrary finder finds a person to be rescued during mountain climbing, the image being obtained by photographing biometric information of the person to be rescued by the terminal of the finder;
control authentication using the registered biometric information for the biometric information contained in the image; and
transmit rescue request information to a rescue system in a case where the authentication is succeeded, the rescue request information containing the personal information associated with the biometric information and the positional information received from the terminal.

2. The rescue support apparatus according to claim 1, wherein the at least one processor is further configured to execute the instruction to:
receive supplementary information acquired by the terminal from the terminal in response to an operation of the finder; and
transmit the rescue request information in which the supplementary information is further contained.

3. The rescue support apparatus according to claim 2, wherein the supplementary information contains an image obtained by photographing surroundings where the person to be rescued was found.

4. The rescue support apparatus according to claim 2,
wherein the supplementary information contains an image obtained by photographing parts other than a face of the person to be rescued.

5. The rescue support apparatus according to claim 2,
wherein the supplementary information contains text data or voice data inputted by the finder regarding a state of the person to be rescued or surroundings where the person to be rescued is found.

6. The rescue support apparatus according to claim 1,
wherein the personal information contains at least one of a blood type, a past medical history, allergy information, vaccination information, or infectious disease test information of the prospective climber.

7. The rescue support apparatus according to claim 1,
wherein at least one processor is further configured to execute the instruction to notify the terminal of notification information based on a response acquired from the rescue system in response to the rescue request information.

8. The rescue support apparatus according to claim 7,
wherein the notification information contains an estimated time when a rescue team arrives at the person to be rescued.

9. The rescue support apparatus according to claim 8,
wherein the notification information contains advice information for the finder until the estimated time.

10. The rescue support apparatus according to claim 1,
wherein the at least one processor is further configured to execute the instruction to:
register a plan for climbing of the prospective climber so as to be further associated with the biometric information;
verify the plan for climbing associated with the biometric information in a case where the prospective climber succeeds the authentication at a time of start of the mountain climbing;
issue a digital climbing certificate to the prospective climber in a case where the verification is succeeded; and
register the digital climbing certificate so as to be further associated with the biometric information.

11. A rescue support system comprising:
a portable terminal carried by a predetermined person; and
a rescue support apparatus,
wherein the rescue support apparatus is configured to:
register biometric information and personal information of a prospective climber so as to be associated with each other,
wherein the portable terminal is configured to:
photograph an image containing biometric information of a person to be rescued in a case where the predetermined person finds the person to be rescued during mountain climbing; and
transmit the image and positional information of the portable terminal to the rescue support apparatus,
wherein the rescue support apparatus is further configured to:
control authentication using the registered biometric information for the biometric information contained in the image received from the portable terminal; and
transmit rescue request information to a rescue system in a case where the authentication is succeeded, the rescue request information containing the personal information associated with the biometric information and the positional information received from the portable terminal.

12. The rescue support system according to claim 11,
wherein the rescue support apparatus is further configured to:
receive supplementary information acquired by the portable terminal from the portable terminal in response to an operation of the person; and
transmit the rescue request information in which the supplementary information is further contained.

13. A non-transitory computer readable medium in which a rescue support program is stored, the rescue support program causing a computer to execute:
registration processing configured to register biometric information and personal information of a prospective climber so as to be associated with each other;
reception processing configured to receive an image and positional information of a terminal of an arbitrary finder from the terminal in a case where the arbitrary finder finds a person to be rescued during mountain climbing, the image being obtained by photographing biometric information of the person to be rescued by the terminal of the finder;
authentication control processing configured to control authentication using the registered biometric information for the biometric information contained in the image; and
rescue request processing configured to transmit rescue request information to a rescue system in a case where the authentication is succeeded, the rescue request information containing the personal information associated with the biometric information and the positional information received from the terminal.

* * * * *